United States Patent [19]

Hurt

[11] 4,168,802
[45] Sep. 25, 1979

[54] SELF PROPELLED AGRICULTURAL SPRAYING VEHICLE

[75] Inventor: Charles R. Hurt, Jonesboro, Ark.

[73] Assignee: Hustler Corporation, Jonesboro, Ark.

[21] Appl. No.: 793,134

[22] Filed: May 2, 1977

[51] Int. Cl.² .................. A01G 25/09; B62D 11/08
[52] U.S. Cl. .................................. 239/172; 180/6.48; 280/686
[58] Field of Search .................. 152/9; 180/6.2, 6.66, 180/6.48; 239/146, 159, 172, 178, 305; 47/1.7; 280/686

[56] References Cited

U.S. PATENT DOCUMENTS

| | | | |
|---|---|---|---|
| 1,651,367 | 12/1927 | Blackmore | 180/6.66 |
| 2,424,468 | 7/1947 | Keathley | 239/305 X |
| 2,503,111 | 4/1950 | Higgins | 180/6.2 X |
| 2,698,186 | 12/1954 | Pehl | 280/686 X |
| 2,976,647 | 3/1961 | Pickrell | 239/159 X |

*Primary Examiner*—Robert B. Reeves
*Assistant Examiner*—Andres Kashnikow

[57] ABSTRACT

A vehicle for travel along rice field levees and the like to spray chemicals upon such levees so as to control the growth of unwanted vegetation thereon. The vehicle includes a frame member having first and second sides. A pair of wheels are pivotally mounted to each side of the frame through elongated arm members in such a manner so as to hold the frame high above the supporting surface of the vehicle. The wheels mounted on each side of the frame are simultaneously driven by a motor separately from the wheels mounted on the other side of the frame in such a manner that the vehicle may be steered by individually controlling the rotation of the wheels on either side of the vehicle to thereby allow "skid steer" type steering of the vehicle.

2 Claims, 6 Drawing Figures

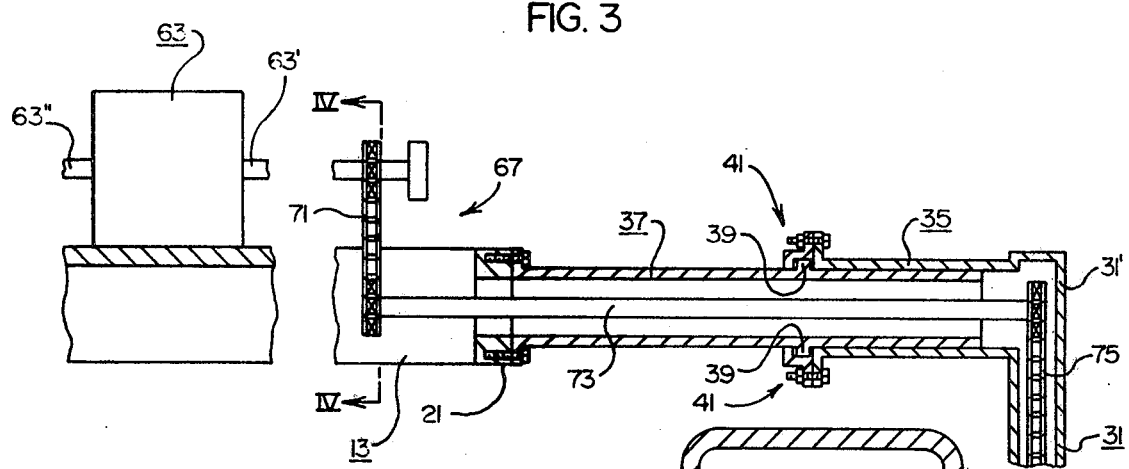
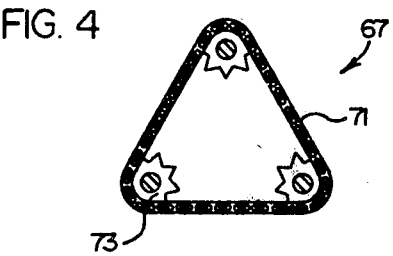
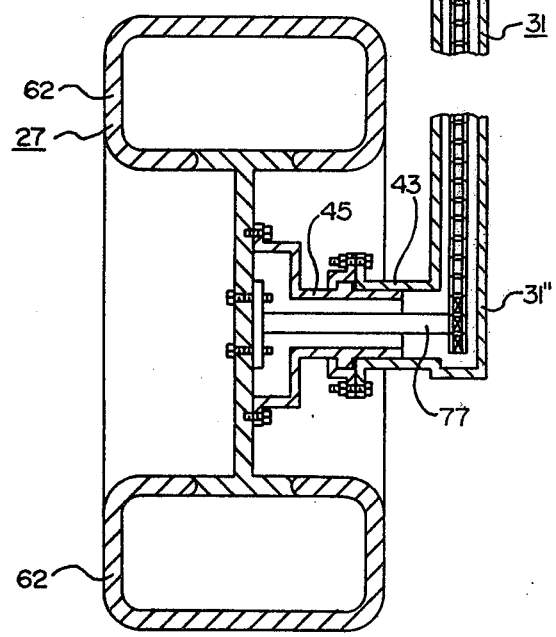
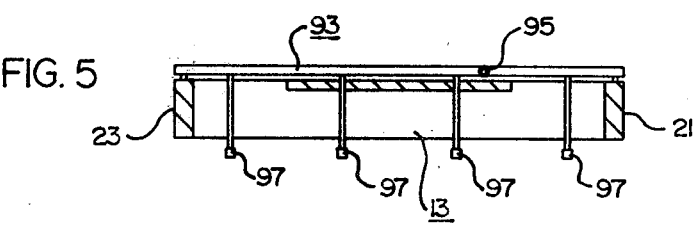
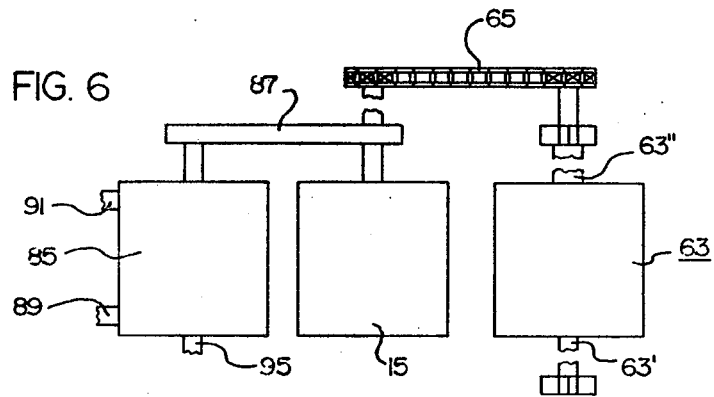

SELF PROPELLED AGRICULTURAL SPRAYING VEHICLE

BACKGROUND OF THE INVENTION

1. Field of the Invention

This invention relates generally to self-propelled vehicles for applying chemicals to fields and the particular vehicles for use in spraying liquid herbicides and the like onto fields under cultivation to inhibit growth of undesirable vegetation.

2. Description of the Prior Art

Heretofore, in general, three devices have been used for applying agricultural chemicals to fields under cultivation: (1) aircraft mounted spray devices; (2) tractor mounted spray devices; and (3) hand carried spray devices. Each of these devices are disadvantageous for one reason or another, especially when the levees of rice fields and the like are being sprayed. For example, while aircraft mounted spray devices are very fast, they are expensive and are subject to inaccuracies in application because of overspray and drift. Overspray and drift are not merely wasteful of chemicals but can be disastrous to crops in adjacent fields. For example, the herbicides used for the control of broad-leaf weeds will also attack broad-leaf plants such as cotton and soybeans.

Tractor-mounted spray devices help eliminate the problem of overspray and drift since better control of the spray pattern is provided. A tractor, however, is a relatively expensive piece of equipment and equipping and using one for spray service renders it unavailable for other tasks. In addition, a tractor, being quite heavy, can enter the field only if the soil moisture content is below a certain level, otherwise, the tractor will easily become mired in the soft ground. It can be seen that such a tractor-mounted spray device would be virtually useless in a flooded rice field. The tractor was first designed for pulling implements such as plows or cultivators for breaking ground and this requirement still dictates its design. With this in mind, it can be seen that what would be sufficient ground clearance for plowing might not be enough for a field in which substantial growth has occurred. That is, plants and earthworks, such as levees can easily be damaged by a tractor passing over them. Also, a tractor designed to pull heavy loads must have wheels that heavily engage the ground surface in order to develop the required traction. This feature would, of necessity, cause the tractor to damage any earthworks such as levees over which it is driven. Even if dry, the levees in a rice field would be too fragile to long withstand such abuse. Also, directional control of a tractor is obtained by turning the front wheels thereof in a manner substantially identical to that in a standard automobile. Thus, assuming that the field to be sprayed is dry enough so that the tractor will not be come mired, it could still be wet enough to where steering would become marginal or non-existent. It should be noted that a light-weight tractor has been developed for overcoming many of the disadvantages of a standard tractor. This light weight vehicle is constructed to obtain high ground clearance and is commonly known to those skilled in the art as a "highboy". It overcomes some of the undesirable characteristics of a standard tractor such as cost, weight, etc., but it is still steered by conventional means and can only be used under relatively dry conditions and in fields of relatively flat terrain.

Hand carried spray devices are used where it is impossible or undesirable to use present mechanized vehicles. The spraying of levees in rice fields is a case in point. Application is accurate but the disadvantages are both numerous and obvious. These units weigh in the neighborhood of 75 lbs. when full. Worker fatigue is a real problem complicated by the fact that most spraying is done in the midsummer months. Also, rice fields contain other worker hazards such as unsure footing plus a tendency to breed dangerous animal life such as muskrats and water moccasins.

Applicant is aware of the following United States patents which relate generally to the present invention: Finley et al, U.S. Pat. No. 2,822,216; Blue et al, U.S. Pat. No. 3,033,301; Bailey, U.S. Pat. No. 3,341,970; Bernshausen, U.S. Pat. No. 3,584,446; Crimmins et al, U.S. Pat. No. 3,666,178; Harden, U.S. Pat. No. 3,683,547; and Koziol, U.S. Pat. No. 3,866,397. None of the above patents disclose, teach or suggest the present invention.

BRIEF DESCRIPTION OF THE DRAWINGS

FIG. 3 is a partially sectional view of a portion of the agricultrual spraying vehicle of the present invention showing one wheel member of one of the wheel means thereof operatively coupled to the transmission means thereof.

FIG. 4 is a partially sectional view as taken on line IV—IV of FIG. 3.

FIG. 5 is a partially sectional view as taken on line V—V of FIG. 2.

FIG. 6 is a somewhat diagramatic view of the motor means and portions of the sprayer means and transmission means of the agricultural sprayings vehicle of the present invention.

DESCRIPTION OF THE PREFERRED EMBODIMENT

The vehicle 11 of the present invention is for use in spraying chemicals upon vegetation to control the growth of the vegetation. More specifically, the vehicle 11 is preferably used in applying liquid herbicides to cultivated fields to inhibit the growth of undesirable plants especially along the levees of a rice field or the like. The need for such application of herbicides along the levees of a rice field is apparent to those skilled in the art. At certain stages during cultivation, rice fields are flooded. Control of the flooding is obtained by throwing up earthworks in the form of dikes or levees around the area to be flooded. While the water will inhibit the growth of many undesirable plants in the flooded areas, ideal conditions for growth exist on the levees. This growth is mot merely a nuisance but rather, if the grass when harvested becomes contaminated with foreign seeds such as morning glory, cocklebur, coffee bean, indigo, or the like, its commercial value is downgraded drastically. It is, therefore, imperative from an economic standpoint that these growths be brought under rigid control if not eliminated altogether. The vehicle 11 includes, in general, a frame means 13, first and second wheel means rotatably mounted to the frame means 13, a motor means 15, a transmission means for selectively rotating the first and/or second wheel means to cause the vehicle 11 to move, a tank means mounted to the frame means 13 for holding a quantity of vegetation controlling chemicals, and a sprayer means operatively coupled to the tank means for selectively spraying chemicals from the tank means upon vegetation adjacent the vehicle 11.

Figure 1:
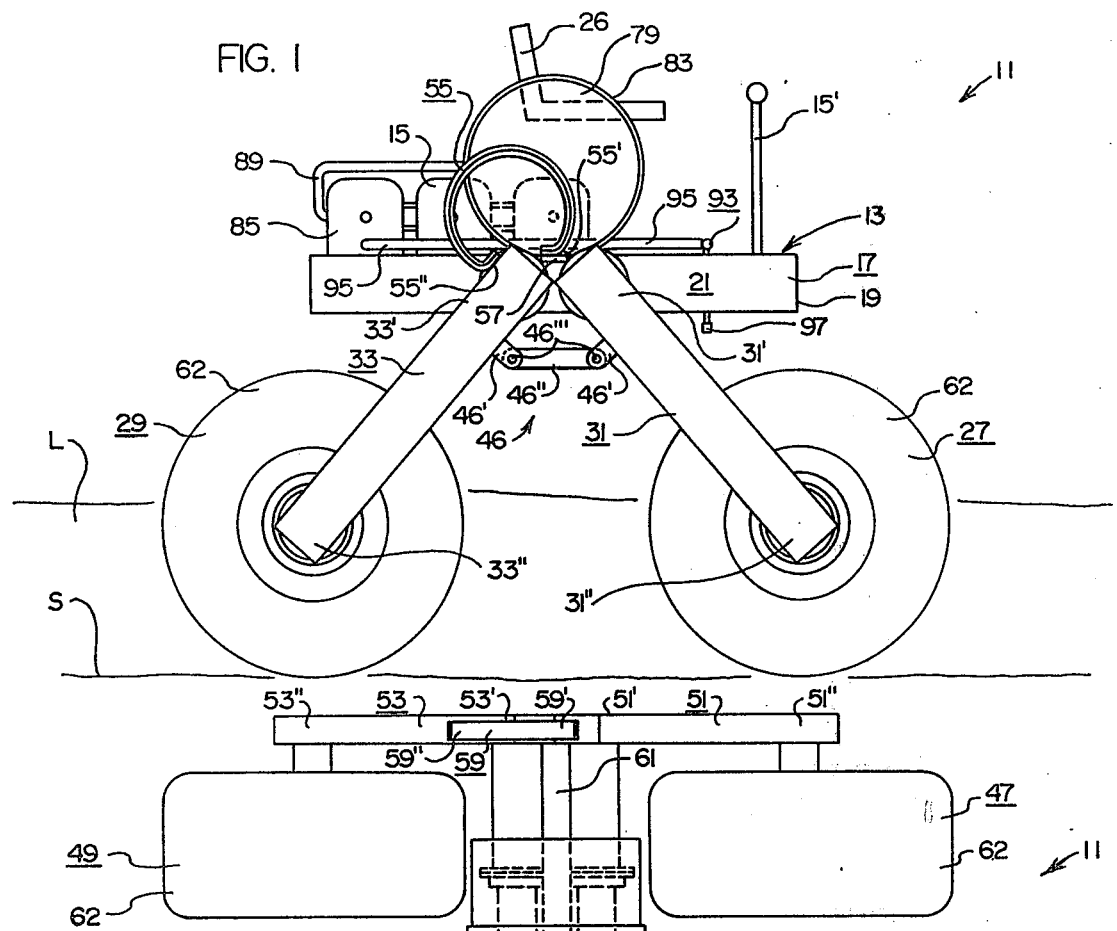
FIG. 1 is a side elevational view of the agricultural spraying vehicle of the present invention.
Figure 2:
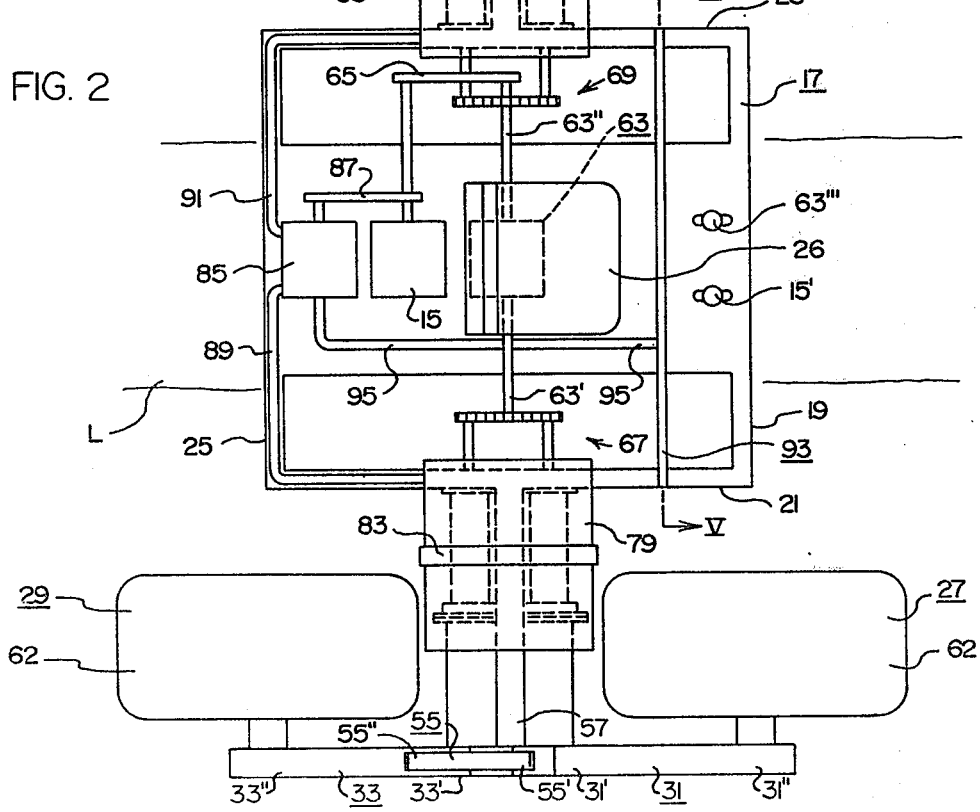
FIG. 2 is top plan view thereof.

The frame means 13 preferably consists of a substantially flat platform-like member 17 which may be constructed in any manner apparent to those skilled in the art. For example, the platform like member 17 may be of a substantially open construction having four bar members fixedly attached together to form an open square as clearly shown in FIG. 2 with one bar member defining the front end 19 of the platform-like member 17, with another bar member defining another side 21 of the platform-like member, with another bar member defining a second side 23 of the platform-like member 17, and with the last bar member defining the rear end 25 of the platform-like member 17. Additional support members may be attached to the bar members as will hereinafter become apparent. A seat member 26 is preferably provided on the frame means 13 as shown in FIGS. 1 and 2 for use by the operator of the vehicle 11.

The first wheel means preferably includes first and second rotatable wheel members 27, 29. Each of the first and second wheel members 27, 29 are suspended from the first side 21 of the platform-like member 17 of the frame means 13. More specifically, the vehicle 11 preferably includes a first arm means for suspending the first and second wheel members 27, 29 of the first wheel means to the frame means 13. The first arm means preferably includes first and second arm members 31, 33. Each of the first and second arm members 31, 33 preferably has first and second ends 31', 31"; 33', 33" respectively. The first ends 31', 33' of the first and second arm members 31, 33 are preferably pivotally mounted to the first side 21 of the platform-like member 17 of the frame means 13 in any manner apparent to those skilled in the art. For example, a hollow cylindrical sleeve member 35 may be fixedly attached to the first end 31' of the first arm member 31 as shown in FIG. 3. Another hollow sleeve member 37 having an outside diameter somewhat smaller than the inside diameter of the sleeve member 35 may be fixedly attached to the first side 21 of the platform-like member 17 of the frame means 13 as shown in FIG. 3. To pivotally attach the first arm member to the first side 21 of the frame means 13, the sleeve member 35 is merely positioned on the sleeve member 37 as shown in FIG. 3. Means may be provided for rotatably securing the sleeve member 35 to the sleeve member 37. For example, the sleeve member 37 may be provided with an annular ridge 39 and the sleeve member 35 may be provided with a clamp-like member 41 for being positioned over the annular ridge 39 as shown in FIG. 3 to rotatably attach the sleeve member 35 to the sleeve member 37 in a manner which should be apparent to those skilled in the art from FIG. 3. The first end 33' of the second arm member 33 may be pivotally attached to the first side 21 of the platform-like member 17 of the frame means 13 in a similar manner to the first end 31' of the first arm member 31. The first and second wheel members 27, 29 of the first wheel means are preferably rotatably mounted to the second ends 31", 33" of the first and second arm members 31, 33 in any manner apparent to those skilled in the art. For example, the wheel members 27, 29 may be rotatably attached to the arm members 31, 33 in a similar manner to the pivotal attachment of the arm members 31, 33 to the frame means 13. That is, a hollow sleeve member 43 may be fixedly attached to the second end 31" of the first arm member 31 and a hollow sleeve member 45 having an outside diameter somewhat less than the inside diameter of the hollow sleeve member 43 may be fixedly attached to the first wheel member 27 as shown in FIG. 3. Thus, when the hollow sleeve member 45 is positioned within the hollow sleeve member 43, the wheel member 27 will be rotatably attached to the arm member 31. Means may also be provided for rotatably attaching the sleeve member 43 to the sleeve member 45 similar to the means heretofore discussed for rotatably attaching the sleeve member 35 to the sleeve member 37. The second wheel member 29 may be likewise rotatably attached to the second end 33" of the second arm member 33. Linkage means 46 (See FIG. 1) is preferably provided for linking the first and second arm members 31, 33 together so that when one of the first or second arm member 31, 33 pivots relative to the frame means 13, the other arm member 31, 33 will also pivot a substantially like amount. The linkage means 46 may be of any construction apparent to those skilled in the art. For example, the linkage means 46 may include a lug members 46' fixedly attached to each of the first and second arm members 31, 33 as shown in FIG. 1, a bridge member 46" extending between each lug member 46' as shown in FIG. 1, and a bolt means attaching the bridge member 46" to each lug member 46' as shown in FIG. 1.

The second wheel means preferably includes first and second wheel member 47, 49. Each of the first and second wheel members 47, 49 suspended from the second side 23 of the platform-like member 17 of the frame means 13. Preferably, the vehicle 11 includes a second arm means for suspending the first and second wheel members 47, 49 of the second wheel means to the frame means 13. The second arm means preferably includes first and second elongated arm member 51, 53. Each of the first and second arm member 51, 53 has first and second ends 51', 51"; 53'; 53" respectively. The first ends 51', 53' of the first and second arm members 51, 53 are rotatably mounted to the first and second wheel members 47, 49 of the second wheel means in any manner apparent to those skilled in the art such as in the manner heretofore described by which the first arm member 31 is rotatably mounted to the first wheel member 27 of the first wheel means. Linkage means (not shown) is also preferably provided for linking the first and second arm members 51, 53 together so that when one of the first or second arm members 51, 53 pivots relative to the frame means 13, the other arm member 51,53 will also pivot a substantially like amount. The linkage means may be of any construction apparent to those skills in the art such as the construction heretofore discussed relative to the linkage means 46.

The vehicle 11 is preferably provided with a first spring means operatively coupled to the frame means 13 and to the first arm means for springably holding the first and second wheel members 27, 29 of the first wheel means below the level of the frame means 13. The first spring means preferably includes a leaf spring member 55 having a first end 55' fixedly attached to the frame means 13 and having a second end 55" fixedly attached to substantially the first end 33' of the second arm member 33 of the first arm means as shown in FIGS. 1 and 2. It should be noted that the frame means 13 may be provided with an outwardly extending support member 57 fixedly attached to the first side 21 of the platform-like member 17 for allowing the first end 55' of the leaf spring member 55 to be attached thereto. (See FIGS. 1 and 2) The vehicle 11 also preferably includes a second spring means operatively coupled to the frame means 13 and to the second arm means for springably holding the first and second wheel members 47, 49 of the second wheel means below the level of the frame means 13. The second spring means preferably includes a leaf spring member 59 having a first end 59' fixedly attached to the frame means 13 and having a second end 59" fixedly attached to substantially the first end 53' of the second arm member 53 of the second arm means (see FIG. 2). It should be noted that the frame means 13 is preferably provided with an outwardly extending support member 61 for being fixedly attached to the second side 23 of the platform-like member 17 of the frame means 13 to allow the first end 59' of the leaf spring member 59 to be attached thereto. (see FIG. 2).

Each of the first and second wheel members 27, 29, 47, 49, of the first and second wheel means preferably include a high-flotation type tire 62 of any type well known to those skilled in the art for making the vehicle 11 more stable and for give the vehicle 11 better traction on ground and in water. Preferably, the frame means 13 of the vehicle 11 is positioned above the supporting surface S thereof a distance greater than the diameter of the high-flotation type tires 62 as clearly shown in FIG. 1.

The motor means 15 of the vehicle 11 preferably consists of any gas-operated internal combustion engine or the like well known to those skilled in the art. A control member 15' or the like is preferably provided adjacent the seat member 26 of the vehicle 11 for allowing the operator of the vehicle 11 to control the motor means 15 from the seat member 26.

The transmission means is operatively coupled to the motor means 15 and to the first and second wheel means for selectively causing both of the first and second wheel members 27, 29, 47, 49 of the first and/or second wheel means to simultaneously rotate. Preferably, the transmission means is adapted to selectively cause the wheel members 27, 29, 47, 49 to move the vehicle 11 in a forward or reverse direction. The transmission means preferably includes a dual transmission member 63 operatively coupled to the motor means 15 by a drive belt 65 or the like. The transmission member 63 preferably has first and second output shafts 63', 63". A control member 63''' or the like is preferably provided adjacent the seat member 26 of the vehicle 11 for allowing the operator of the vehicle 11 to control the transmission member 63 from the seat member 26. It should be noted that Borg Warner Corp. of 1106 E. Seymour Street, Muncie, Indiana 47302 manufactures such a transmission member under the trademark "Skid Steer" identified as Model T20.

The transmission means also preferably includes a first drive means 67 for operatively coupling the first output shaft 63' of the transmission member 63 to the first and second wheel members 27, 29 of the first wheel means and preferably includes a second drive means 69 for operatively coupling the second output shaft 63" of the transmission member 63 and the first and second wheel members 47, 49 of the second wheel means (See, in general, FIGS. 2 and 3). The first and second drive means 67, 69 preferably consist of a first drive belt or chain 71, a first drive shaft 73, a second drive belt or chain 75, and a second drive shaft 77 for operatively coupling the output shafts 63', 63" of the transmission member 63 to the wheel members 27, 29, 47, 49 as clearly shown in FIGS. 2 and 3. Each of the arm members 31, 33, 51, 53 of the first and second arm means are preferably hollow to allow portions of the first and second drive means 67, 69 to pass therethrough to transmit power to the wheel members 27, 29, 47, 49 as shown in FIG. 3.

The tank means of the vehicle 11 preferably includes first and second tank members 79, 81 mounted on the frame means 13. The first and second tank member 79, 81 may be of any construction well known to those skilled in the art and may be fixedly mounted to the frame means 13 in any manner well known to those skilled in the art. For example, an adjustable metal band 83 or the like may be positioned around each tank member 79, 81 for fixedly attaching the tank members 79, 81 to the frame means 13 in any manner well known to those skilled in the art, as shown in FIGS. 1 and 2.

The sprayer means of the vehicle 11 preferably includes a pump means 85 operatively coupled to the motor means 15 in any manner well known to those skilled in the art such as by a drive belt or chain 87. The pump means 85 is also operatively coupled to the first and second tank members 79, 81 in any manner apparent to those skilled in the art to selectively pump chemicals from the first and second tank members 79, 81. For example, the pump means 85 may be operatively coupled to the first and second tank member 79, 81 by a pair of hollow hose members 89, 91 (see, in general, FIG. 2). The sprayer means also preferably includes a spray discharge manifold means 93 operatively coupled to the pump means 85 for receiving pumped chemicals therefrom. A hollow hose member 95 may be used to operatively couple the spray discharge manifold means 93 to the pump means 85 (see, in general, FIG. 2). The spray discharge manifold means 93 is preferably attached to and extends transversely across the platform-like member 17 of the frame means 13 as shown in FIGS. 2 and 5. The spray discharge manifold means 93 preferably includes a plurality of downwardly directed spray discharge port members 97 for allowing the pumped chemicals received by the spray discharge manifold means 93 to be discharged therefrom beneath the vehicle 11 (see FIG. 5).

To use the vehicle 11 of the present invention to spray chemicals onto the levees of a rice field or the like, the vehicle 11 is positioned with the first and second wheel means straddling a levee L and with the spray discharge manifold means 93 positioned over the levee L as shown in FIGS. 1 and 2. It should be noted that the first and second wheel members 27, 29, 47, 49 of the first and second wheel means are preferably positioned on either side, or outboard, of the frame means 13 as clearly shown in FIG. 2 for allowing the vehicle 11 to easily straddle levees L and the like. Also, it should be noted that with the pivotal mounting of the arm members 31, 33, 51, 53 and with the mounting of the arm members 31, 33 on one side of the vehicle 11 being independent from the arm members 51, 53 on the other side, all of the wheel members 27, 29, 47 and 49 will remain in contact with the ground regardless of any hills, depressions, or the like encountered by vehicle 11. Additionally, it should be noted that the estimated average unit ground pressure for a "highboy" type of vehicle would be in the order of 6 p.s.i. whereas the vehicle of the present invention could be expected to exert pressures in the neighborhood of 4 p.s.i. assuming similar ground conditions. Also, it should be pointed out that a tractor would exert considerably more pressure than either of the above. The operater of the vehicle 11 then drives the vehicle 11 along the levee and activates the sprayer means to spray chemicals through the spray discharge port members 97.

Also though the invention has been described and illustrated with respect to a preferred embodiment thereof, it is not to be so limited since changes and modifications may be made therein which are within the full intended scope of the invention.

I claim:
1. A vehicle for use in spraying chemicals upon vegetation to control the growth of the vegetation, said vehicle comprising:
 (a) frame means having first and second sides;
 (b) first wheel means having first and second rotatable wheel members suspended from said first side of said frame means;
 (c) second wheel means having first and second rotatable wheel members suspended from said second side of said frame means;
 (d) motor means mounted on said frame means;
 (e) transmission means operatively coupled to said motor means and to said first and second wheel means for selectively causing both of said first and second wheel members of said first and/or second wheel means to simultaneously rotate;
 (f) tank means mounted on said frame means for holding a quantity of vegetation-controlling chemicals;
 (g) sprayer means operatively coupled to said tank means for selectively spraying chemicals from said tank means upon vegetation adjacent said vehicle;
 (h) first arm means for suspending said first and second wheel members of said first wheel means to said frame means, said first arm means including first and second elongated arm members, each of said first and second arm members of said first arm means having first and second ends, said first ends of said first and second arm members of said first arm means being pivotally mounted to said first side of said frame means, said second ends of said first and second arm members of said first arm means being rotatably mounted to said first and second wheel members respectively of said first wheel means;
 (i) second arm means for individually suspending said first and second wheel members of said second wheel means to said frame means, said second arm means including first and second elongated arm members, each of said first and second arm members of said second arm means having first and second ends, said first ends of said first and second arm members of said second arm means being pivotally mounted to said second side of said frame means, said second ends of said first and second arm members of said second arm means being rotatably mounted to said first and second wheel members respectively of said second wheel means;
 (j) first spring means operatively coupled to said frame means and to said first arm means for springably holding said first and second wheel members of said first wheel means below the level of said frame means, said first spring means including a leaf spring member having a first end fixedly attached to said frame means and having a second end fixedly attached substantially to said first end of said second arm member of said first arm means; and
 (k) second spring means operatively coupled to said frame means and to said second arm means for springably holding said first and second wheel members of said second wheel means below the level of said frame means, and in which said second spring means includes a leaf spring member having a first end fixedly attached to said frame means and having a second end fixedly attached substantially to said first end of said second arm member of said second arm means.

2. A vehicle for use in spraying chemicals upon vegetation to control the growth of the vegetation, said vehicle comprising:
 (a) frame means having first and second sides;
 (b) first wheel means having first and second rotatable wheel members suspended from said first side of said frame means;
 (c) second wheel means having first and second rotatable wheel members suspended from said second side of said frame means;
 (d) motor means mounted on said frame means;
 (e) transmission means operatively coupled to said motor means and to said first and second wheel means for selectively causing both of said first and second wheel members of said first and/or second wheel means to simultaneously rotate, said transmission means being adapted to selectively cause said wheel members to move said vehicle in a forward or reverse direction, said transmission means including a dual transmission member operatively coupled to said motor means, said dual transmission member having first and second output shafts, said transmission means including first drive means for operatively coupling said first output shaft of said dual transmission member and said first and second wheel members of said first wheel means, said transmission means including second drive means for operatively coupling said second output shaft of said dual transmission members and said first and second wheel members of said second wheel means, each of said first and second output shafts of said dual transmission member being individually controllable to allow the rotation of each of said first and second wheel means to be individually controlled;
 (f) tank means mounted on said frame means for holding a quantity of vegetation-controlling chemicals;
 (g) sprayer means operatively coupled to said tank means for selectively spraying chemicals from said tank means upon vegetation adjacent said vehicle;
 (h) first arm means for suspending said first and second wheel members of said first wheel means to said frame means, said first arm means including first and second elongated arm members, each of said first and second arm members of said first arm means having first and second ends, said first ends of said first and second arm members of said first arm means being pivotally mounted to said first side of said frame means, said second ends of said first and second arm members of said first arm means being rotatably mounted to said first and second wheel members respectively of said first wheel means; and
 (i) second arm means for individually suspending said first and second wheel members of said second wheel means to said frame means, said second arm means including first and second elongated arm members, each of said first and second arm members of said second arm means having first and second ends, said first ends of said first and second arm members of said second arm means being pivotally mounted to said second side of said frame means, said second ends of said first and second arm members of said second arm means being rotatably mounted to said first and second wheel members respectively of said second wheel means; each of said arm members of said first and second arm means being hollow for allowing portions of said first and second drive means of said transmission means to pass therethrough for transmitting power therethrough.

* * * * *